(12) United States Patent
Schneider et al.

(10) Patent No.: US 8,904,134 B2
(45) Date of Patent: Dec. 2, 2014

(54) METHOD AND SYSTEM OF COMMUNICATION BETWEEN A TRANSPONDER AND A BASE STATION

(75) Inventors: Peter Schneider, Hassmersheim (DE); Roland Schropp, Erlenbach (DE); Martin Berhorst, Heidelberg (DE); Sebastian Bock, Neckarwestheim (DE)

(73) Assignee: Atmel Corporation, San Jose, CA (US)

( * ) Notice: Subject to any disclaimer, the term of this patent is extended or adjusted under 35 U.S.C. 154(b) by 363 days.

(21) Appl. No.: 12/836,047

(22) Filed: Jul. 14, 2010

(65) Prior Publication Data

US 2011/0021249 A1    Jan. 27, 2011

(30) Foreign Application Priority Data

Jul. 21, 2009  (DE) .......................... 10 2009 034 300

(51) Int. Cl.
*G06F 12/00* (2006.01)
*G06K 19/073* (2006.01)
*G06K 19/07* (2006.01)

(52) U.S. Cl.
CPC ...... *G06K 19/0723* (2013.01); *G06K 19/07309* (2013.01)
USPC ................... 711/163; 711/E12.091

(58) Field of Classification Search
None
See application file for complete search history.

(56) References Cited

U.S. PATENT DOCUMENTS

| | | | | |
|---|---|---|---|---|
| 5,422,636 A * | 6/1995 | Urbas et al. | ................... | 340/10.4 |
| 5,430,447 A * | 7/1995 | Meier | ......................... | 340/10.51 |
| 2005/0140501 A1* | 6/2005 | Rizzo et al. | ................ | 340/10.51 |
| 2005/0210213 A1 | 9/2005 | Hediger et al. | | |
| 2009/0235073 A1* | 9/2009 | Braun et al. | .................. | 713/169 |
| 2010/0039268 A1* | 2/2010 | Huther | ....................... | 340/573.1 |

FOREIGN PATENT DOCUMENTS

DE    10 2004 013 176 B4    9/2007

OTHER PUBLICATIONS

Sven Tantau: "Principles and Fields of Application of Chip Cards," University of Bonn, Institute of Computer Science III, Apr. 10, 2002.
Christian Pfaller: "Chip Card OS Operating Systems for Chip Cards," Main Seminar: New Operating Systems—Approaches for Operating Systems of the Future, Technical University of Munich, Institute of Computer Science, Jun. 29, 2000.

* cited by examiner

*Primary Examiner* — Larry Mackall
(74) *Attorney, Agent, or Firm* — Baker Botts LLP

(57) ABSTRACT

A transponder having a transmitting and receiving device for receiving commands and transmitting data and command processor for executing commands, and a programming device for changing the memory contents, and a data memory which has a first memory area and a second memory area, whereby the first memory area has the first value or a second value, and when the first memory area has the first value, the content of both memory areas can be changed and, in the case of read access to the second memory area, the transmitting/receiving device transmits a predefined or no data stream instead of the memory content of the second memory area.

11 Claims, 1 Drawing Sheet

METHOD AND SYSTEM OF COMMUNICATION BETWEEN A TRANSPONDER AND A BASE STATION

This nonprovisional application claims priority under 35 U.S.C. §119(a) to German Patent Application No. DE 10 2009 034 300.8, which was filed in Germany on Jul. 21, 2009, and which is herein incorporated by reference.

BACKGROUND OF THE INVENTION

1. Field of the Invention

The present invention relates to a transponder, a system, and a method of communication between a transponder and a base station.

2. Description of the Background Art

Transponders are known from, for example, German Pat. Application No. DE 10 2004 013 176 B4, which correspond to U.S. Publication No. 20050210213, and which is incorporated herein by reference. In this regard, memory areas that are restricted or write-protected can be addressed by certain commands and the content can be changed selectively.

A drawback in the conventional art is that it is potentially possible to change memory content at any time, in order to falsify, for example, the origin data or unique assignability in a product-related application by manipulating the information provided therefor.

SUMMARY OF THE INVENTION

It is therefore an object of the present invention to provide a transponder suitable for this purpose, as well as a system and a method. According to an embodiment of the invention, a transponder with a transmitting and receiving device for receiving commands and transmitting data is provided, having command processing means for executing commands, a programming device for changing the memory contents, and a data memory, which has a first memory area and a second memory area and the first memory area in this regard has a first value or a second value, whereby when the first memory area has the first value, the content of both memory areas can be changed and, in the case of read access to the second memory area, the transmitting/receiving device transmits a predefined data stream instead of the memory content of the second memory area.

According to another embodiment of the invention, a system is provided, comprising a base station and a transponder, whereby the transponder comprises a transmitting and receiving device for receiving commands and transmitting data, as well as command processing means for executing commands, and a data memory with a first memory area and a second memory area, the first memory area having a first value or a second value, whereby when the first memory area has the first value, in the case of read access by the base station to the second memory area, the transponder transmits a predefined or no data stream instead of a memory content of the second memory area back to the base station by means of the transmitting/receiving device, or, when the first memory area has the second value, in the case of read access to the second memory area, the transmitting/receiving device transmits at least one part of the read content of the second memory area to the base station.

According to a further embodiment of the invention, a method is provided for communication between a base station and a transponder, whereby the transponder has a transmitting and receiving device for receiving commands and transmitting data, and command processing means for executing commands, as well as a data memory with a first memory area and a second memory area, whereby the first memory area has a first value or a second value, whereby when the first memory area has the first value, in the case of read access by the base station to the second memory area, the transmitting/receiving device of the transponder transmits a predefined or no data stream to the base station instead of a memory content of the second memory area, or when the first memory area has the second value, in the case of read access by the base station to the second memory area, at least one part of the content of the second memory area is transmitted by the transmitting/receiving device to the base station.

In an embodiment, a transponder with a transmitting and receiving device for receiving commands and transmitting data is provided, having command processing means for executing commands, a programming device for changing the memory contents, and a data memory, which has a first memory area and a second memory area and the first memory area has a first value or a second value, whereby when the first memory area has the first value, the content of both memory areas can be changed and, in the case of read access to the second memory area, the transmitting/receiving device transmits no data stream instead of the memory content of the second memory area and when the first memory area has the second value, the content of both memory areas cannot be changed and, in the case of read access to the second memory area, the transmitting/receiving device transmits at least one part of the read content of the second memory area.

An advantage of the transponder of the invention is that, depending on the value in the first memory area, the transponder transmits different information on the content of the second memory area by means of the transmitting and receiving unit. If the first memory area has only the first value, the second memory area specifically cannot be read out by read access. The transponder then transmits only a predefined sequence of data, so-called dummy data, or no data to a requesting base station. It is possible as a result to determine by means of a base station the extent to which the second memory area was configured by writing, provided that after the configuration the value of the first memory area is changed to the second value. Only then can the second memory area be read out by the base station.

In an embodiment, when the first memory area has the second value, the content of both memory areas can no longer be changed, in that the content of the second memory area is changed by means of a programming device in the transponder and then to lock both memory areas, the value of the first memory area is set to the second value based on the first value. At least one part of the read content of the second memory area is now transmitted by the transmitting/receiving device, in the case of read access, proceeding from the base station to the second memory area. Tests by the applicant have shown that the locking of the second memory area, which is associated with the change in the value of the first memory area, can be used very advantageously in security-sensitive areas, in that the second memory area is secured against changes or rewriting. As a result, data that contain, for example, user-specific data as well can be written by the transponder manufacturer or a system supplier in the second memory area, which can no longer be changed afterwards by an end customer.

In an embodiment, the value of the first memory area can be changed precisely once from the first value to the second value, in that the transponder has a programming device for changing the memory contents. It is assured as a result that overall the second memory area is written only once and, after the configuration has been completed, a further change by changing the value of the first memory area is reliably prevented. The state of the configuration of the individual transponder can be read out by means of a base station by means of a read command transmitted to the transponder or read access to the second memory area as a function of the value of the first memory area, in that either a predefined data stream, which corresponds to the dummy data, for example, a sequence of zeros or a sequence of ones, or no data stream or the actual content of the second memory area is output. A manipulation of the second memory area is reliably prevented as a result. In particular, during use in the area of product tracking and origin data, manipulations are reliably prevented by means of the fixedly predefined one-way programming. Tests by the applicant have shown that to assure the dependence of access to the second memory area on the first memory area, it is sufficient to form the first memory area as single bit memory cells. Read access is refused or permitted depending on the significance, i.e., zero or one, of the bit, which can also be called the activation bit for read access to the second memory area.

In another embodiment, a special direct access command to the data of the second memory area is provided, to read out the written data of the second memory area until the configuration is completed or the second memory area is written and to verify and optionally to change it. The direct access command can be executed only after already predefined data, therefore dummy data, or no data were output by means of read access to the second memory area. As soon as a reset, preferably a power-on-reset (POR), is performed in the transponder by turning off a carrier field, the read access can be executed by means of the direct access command only again after the output of predefined or no data as a response to a preceding read access or read command.

In another embodiment, at least one unique identification code of the transponder is stored in the second memory area. Tests by the applicant have shown that in addition to the identification code, which can be used, for example, for the unique assignment and tracking in the area of animal identification, information on the baud rate for the communication between transponder and base station, protocol parameters and modulation parameters, and application-specific parameters can be stored in the second memory area.

As the content of the second memory area can be read out only by means of a single read access or read command, when the value of the first memory area is set accordingly, the system manufacturer is forced to activate write protection in the transponder, in order to enable read access to user data in the transponder for the end customer in the second memory area. As a result, the anti-forgery security can be easily checked in a simple advantageous manner by a testing authority or by an end customer.

It is understood that the meaning of the term read access can be understood as being much broader than the term read command. Whereas the term read command comprises a predefined agreed data structure, which is exchanged preferably between a base station and a transponder, the term read access covers any type of access to data in a memory area.

Furthermore, it is understood that in an embodiment in which no data are transmitted back to the base station, the time during which no data is transmitted back is limited, preferably by interruption of the communication by the base station and/or most preferably by transmission of an EOF signal from the transponder to the base station.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
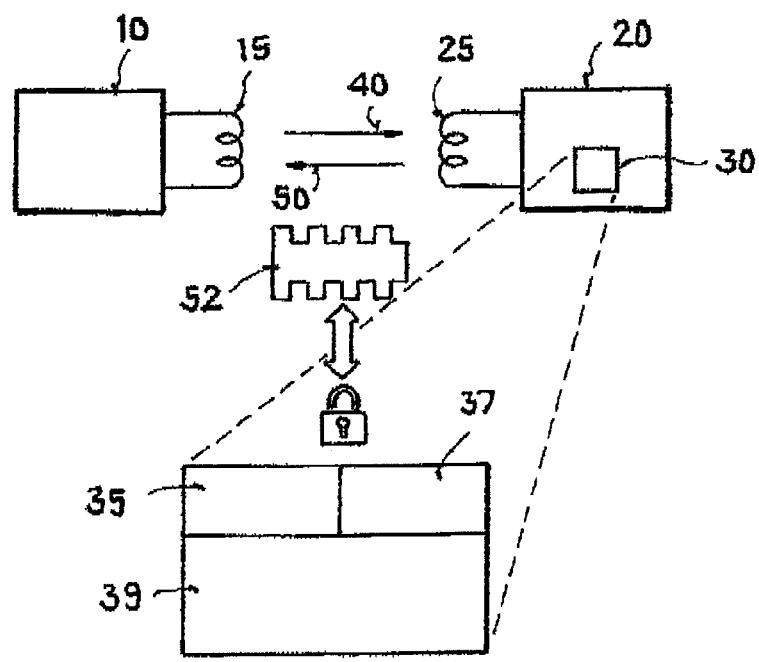
FIG. 1a shows a first embodiment with a base station and a transponder with an unlocked second memory area.

The illustration in FIG. 1 shows a system, consisting of a base station 10 with a transmitting and receiving coil 15 and a transponder 20 with a transmitting and receiving coil 25. The data are transmitted between base station 10 and transponder 20 by transmitting and receiving coils 15, 25. Transponder 20 has a transmitting and receiving device, command processing means, and a programming device (all of these are not shown). Further, transponder 20 has a data memory 30 with a first memory area 35 with a first value, a second memory area 37, which is preferably formed as a configuration area that also comprises user data, and another memory area 39, which is preferably formed as an exclusive user data area.

The operation of the system consisting of base station 10 and transponder 20 will be explained hereinafter. Proceeding from the state that second memory area 37 is not completely configured and first memory area 35 consequently contains the initial value, i.e., the first value, which preferably has the value zero, in the case of a read command 40 from base station 10 for the content of second memory area 37, so-called dummy data 52, i.e., a predefined data stream or no data stream, are transmitted by transponder 20 as a response 50 to base station 10. The difference between dummy data 52 and the actual data, i.e., the data corresponding to the content of second memory area 37, is in the structure of the data stream, which is preferably regular in the case of dummy data 52. Provided base station 10 recognizes the returned data as dummy data 52, any data formats can also be transmitted from transponder 20 back to base station 10. Tests by the applicant have shown that a sequence of zeros or a sequence of ones is especially suitable for labeling dummy data 52. Based on the response 50 recognized as dummy data 52, base station 10 can determine that second memory area 37 is not configured completely.

Figure 1B:
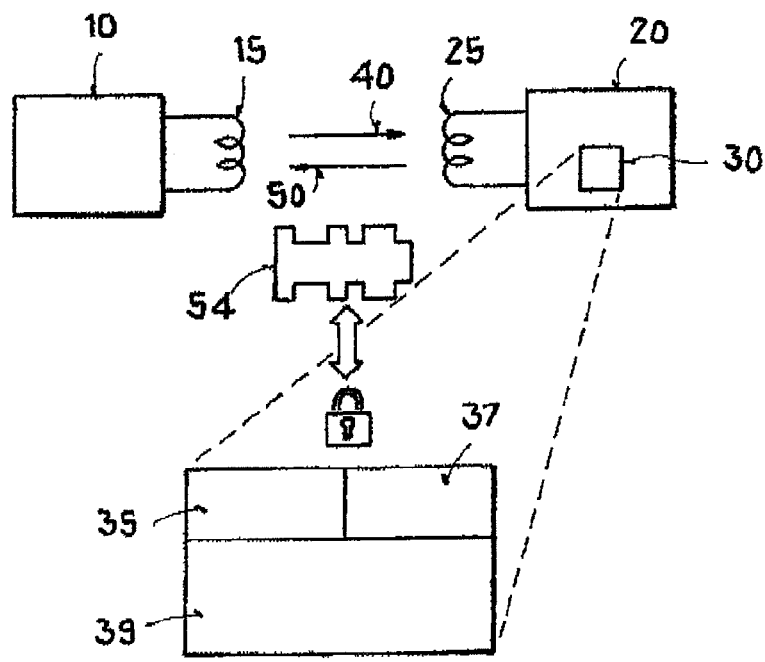
FIG. 1b shows a second embodiment with the base station and the transponder with a locked second memory area.

In the illustration of FIG. 1b, preferably the differences in the explanations are shown in regard to the drawing documents of FIG. 1a. First memory area 35 now contains a second value, which preferably has the value one. This means that second memory area 37 is completely configured by the programming device of the transponder and the first value of first memory area 35 is changed to the second value of first memory area 35. As a result, both memory areas, i.e., first memory area 35 and second memory area 37, are now locked. Locked in the present connection describes the inalterability of the contents of both memory areas. The locking of both memory areas now opens up the possibility of read access by base station 10. As base station 10 accesses the content of second memory area 37 by means of read command 40, transponder 20 as a response 50 transmits a not predefined [data stream] 54, which now corresponds to the read content of second memory area 37. In an alternative embodiment (not shown), the transponder transmits no data stream back to the read command 40.

In fact, inductively coupled systems are suggested both in the case of base station 10 and transponder 20 particularly by the shown coils 15, 25 for transmission and receiving the information to be transmitted wirelessly, but systems that operate in the far field can also be easily used. In particular, the present solution can be implemented in purely passively operating transponders.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A transponder comprising:
   a transmitting and receiving device configured to receive commands and transmitting data;
   a command processor configured to execute the commands;
   a programming device configured to change a memory content; and
   a data memory having a first memory area and a second memory area, the first memory area configured to have a first value that indicates that a predefined or no data stream should be transmitted or a second value that indicates at least one part of a content of the second memory area should be transmitted;
   wherein, when the first memory area has the first value, a content of both the first and second memory areas is changeable;
   wherein the transponder is capable of being communicatively connected to a base station through a wireless medium;
   wherein the programming device is further configured to examine the first memory area in response to receiving a read command for the content of the second memory area from the base station, and:
      in response to determining that the first memory area has the first value, cause the transponder to transmit a predefined or no data stream instead of a memory content of the second memory area back to the base station by using the transmitting and receiving device, the predefined data stream including no portion of the content of the second memory area; and
      in response to determining that the first memory area has the second value, cause the transponder to transmit at least one part of the content of the second memory area to the base station by using the transmitting and receiving device.

2. The transponder according to claim 1, wherein, when the first memory area has the second value, the content of the first and second memory areas cannot be changed and, in the case of a read access to the second memory area, the transmitting and receiving device transmits at least one part of the read content of the second memory area.

3. The transponder according to claim 1, wherein the value of the first memory area is changeable precisely once from the first value to the second value.

4. The transponder according to claim 1, wherein at least one unique identification code of the transponder is stored in the second memory area.

5. The transponder according to claim 1, wherein the first memory area is formed as single bit memory cell.

6. A transponder comprising:
   a transmitting and receiving device configured to receive commands and transmitting data;
   a command processor configured to execute the commands;
   a programming device configured to change memory contents; and
   a data memory having a first memory area and a second memory area, the first memory area configured to have a first value that indicates that a predefined or no data stream should be transmitted or a second value that indicates at least one part of a content of the second memory area should be transmitted,
   wherein, when the first memory area has the first value, a content of both the first and second memory areas is changeable,
   wherein, when the first memory area has the second value, the content of both the first and second memory areas is not changeable;
   wherein the transponder is capable of being communicatively connected to a base station through a wireless medium;
   wherein the programming device is further configured to examine the first memory area in response to receiving a read command for the content of the second memory area from the base station, and:
      in response to determining that the first memory area has the first value, cause the transponder to transmit a predefined or no data stream instead of a content of the second memory area by using the transmitting and receiving device, the predefined data stream including no portion of the content of the second memory area; and
      in response to determining that the first memory area has the second value, cause the transponder to transmit at least one part of the content of the second memory area by using the transmitting and receiving device.

7. A system comprising:
   a base station; and
   a transponder communicatively connectible to the base station by a wireless medium, the transponder comprising:
      a transmitting and receiving device for receiving commands and transmitting data;
      a command processor configured to execute the commands; and
      a data memory having a first memory area and a second memory area,
   the first memory area having a first value that indicates that a predefined or no data stream should be transmitted or a second value that indicates at least one part of a content of the second memory area should be transmitted,
   wherein, the command processor is further configured to examine the first memory area in response to receiving a read command for the content of the second memory area from the base station;
      in response to determining that the first memory area has the first value, cause the transponder to transmit a predefined data or no stream instead of a memory content of the second memory area back to the base station by using the transmitting and receiving device, the predefined data stream including no portion of the content of the second memory area; and
      in response to determining that the first memory area has the second value, cause the transponder to transmit at least one part of the content of the second memory area to the base station by using the transmitting and receiving device.

8. The system according to claim 7, wherein to change the memory contents, the transponder has a programming device and the content of the first memory area is changeable proceeding from the first value precisely once to the second value.

9. The system according to claim 7, wherein, when the first memory area has the second value, the content of both memory areas cannot be changed.

10. A method for communication between a base station and a transponder, the method comprising:
providing the transponder with a transmitting and receiving device for receiving commands and transmitting data, with a command processor for executing commands, and with a data memory having a first memory area and a second memory area, the first memory area having a first value that indicates that a predefined or no data stream should be transmitted or a second value that indicates at least one part of a content of the second memory area should be transmitted;
in response to receiving a read command for the content of the second memory area, the base station communicatively connected to the transponder by a wireless medium, examining the first memory area to determine whether the first memory area has the first value or the second value;
transmitting a predefined or no data stream instead of the content of the second memory area to the base station from the transponder if the examination indicates the first memory area has the first value, the predefined data stream including no portion of the content of the second memory area; and
transmitting at least one part of the content of the second memory area to the base station from the transponder during a read access by the base station of the second memory area if the examination indicates the first memory area has the second value.

11. The method according to claim 10, wherein the content of the second memory area is changed by a programming device in the transponder, and wherein, to lock both memory areas, the value of the first memory area is set proceeding from the first value to the second value.

\* \* \* \* \*